United States Patent [19]

Peil

[11] Patent Number: 4,560,909
[45] Date of Patent: Dec. 24, 1985

[54] DUAL LOAD REMOTE POWER CONTROL FOR A CEILING FAN

[75] Inventor: William Peil, North Syracuse, N.Y.

[73] Assignee: General Electric Company, Fort Wayne, Ind.

[21] Appl. No.: 425,522

[22] Filed: Sep. 28, 1982

[51] Int. Cl.$^4$ .............................................. G05F 1/00
[52] U.S. Cl. ................................. 315/291; 315/178; 315/201; 318/51
[58] Field of Search ............. 315/178, 195, 201, 205, 315/250, 253, 291, 294, 295, 312, 313, 349, 353, 355; 323/905; 328/70; 307/12, 15, 30-32, 38, 41, 146, 155, 156; 318/4, 51, 67, 268, 336

[56] References Cited

U.S. PATENT DOCUMENTS

| | | | |
|---|---|---|---|
| 2,733,383 | 1/1956 | Wilson | 315/353 |
| 3,070,732 | 12/1962 | Crandall et al. | 307/146 X |
| 4,322,632 | 3/1982 | Hart et al. | 370/41 |
| 4,413,211 | 11/1983 | Fowler | 318/51 X |

OTHER PUBLICATIONS

Appliance Manufacture Mar. 1982, p. 78, "Fan Control Needs No Wiring", Teccor Electronics, Euless, Texas.
Application Note, General Electric Company, Semiconductor Products Department, 7/70, "Using the Triac for Control of AC Power", J. H. Galloway.

Primary Examiner—David K. Moore
Attorney, Agent, or Firm—Ralph E. Krisher, Jr.

[57] ABSTRACT

An arrangement is disclosed for controlling the power applied to two remote loads energized from a common ac line. An example is a circuit for controlling fan speed and lamp brightness, both loads being installed in a common ceiling fixture, and requiring only a two conductor interconnection to a wall mounted control circuit. An exemplary control circuit employs two conventional controllers, each having a bidirectional, semiconductor switch, (e.g., a triac) having a manually adjustable conduction duty cycle for power control. The control circuit includes shunt and series diodes for mutual isolation of the controllers and for allocating one controller to one load and the other controller to the other load. The arrangement simplifies installation costs in requiring only a two conductor control connection, and is economic in its selection of components for the control function.

7 Claims, 2 Drawing Figures

DUAL LOAD REMOTE POWER CONTROL FOR A CEILING FAN

BACKGROUND OF THE INVENTION

1. Field of the Invention

This invention relates to solid state power controllers, and more particularly to an application in which power to two loads, such as a combined ceiling fan and light fixture, is individually controlled from a wall mounted double control fixture connected to the ceiling fixture by a conventional two conductor cable.

2. Description of the Prior Art

The invention seeks to find a simple way of reducing the cost of installing a combined ceiling fan and light fixture. The installation costs are particularly severe in situations where the electrical connection boxes and electrical cable between the boxes and to an ac line are already installed in finished partitions and have an insufficient number of conductors for the new installation. If, for instance, the new cabling between boxes requires only two conductors, then the original cabling can usually be reused, and the cost of installation greatly reduced.

The principal methods of controlling plural remote loads in response to control signals conducted over a single communication path have been stepping relays, which can be caused to step to successive switching states upon closure of a single switch. A related approach for load selection, also analogous to a conventional three-way switch, is disclosed in U.S. Pat. No. 4,322,632, Hart et al. A somewhat similar method has been used in model trains, as for instance, the reversing solenoid normally having only two positions, used to permit a toy train engine to run in the forward or reverse sense by the mere reapplication of power. This operation requires no control conductors in addition to the two principal energization conductors but permits power adjustment to the load in either forward or reverse operation of the motor.

In electronic applications, signal routing has conventionally employed "steering diodes", so that it is not unknown that a reduction in conductors may be accomplished by letting the polarity of the control signal permit routing of a signal carried by a single conductor to two different control signal responsive devices. In most wired systems, a single communication path requires a return path in addition to the outgoing path, and this requires two conductors. Thus, when steering diodes are employed, a third conductor for the "ground return" is normally available. This ground return tends to be overlooked in complex circuits, where a large number of circuits share the ground return.

Returning, however, to the application at hand, that is to say, the application of controllable amounts of power to two remotely energized loads—i.e., a combined light and fan—from an ac source, neither of the existing approaches, unmodified, provide an on-off control of each load circuit, adjustment of the amount of power applied to each load, and at the same time the necessary cabling to make power initially available at either the controller or at the load, available at both the controller and the load.

SUMMARY OF THE INVENTION

Accordingly, it is an object of the present invention to provide in an ac powered application, a novel dual load remote power control arrangement.

It is a further object of the present invention to provide a novel dual load remote control arrangement requiring a minimum number of conductors for both load selection and independent adjustment of the power to each load.

It is a further object of the present invention to provide an economic arrangement for independent control of the amount of power supplied to two loads energized from a common ac line.

These and other objects of the invention are achieved in a novel system for independently controlling the power supplied to two loads from a common ac source having a conventional sinusoidal waveform. The double load circuit, which has two connection nodes comprises a first and a second load, each having two terminals, and a first and second diode serially connecting the first and second loads between the load circuit connection nodes, the diodes being connected for load currents in opposite sense. The double power control circuit also has two connection nodes adapted for serial connection with the two connection nodes of the load circuit to the common ac source. The control circuit comprises a first and a second two-terminal semiconductor power controller, each adapted for serial connection with a load to a source, and having an adjustable duty cycle when half-waves of substantially sinusoidal waveform are applied. A suitable power controller is a bidirectional power switch such as a triac switch having two principal electrodes and a gate for controlling the conduction duty cycle, the gate being subject to further control by a resistance capacitance phase shift network coupled to the gate via a bidirectional breakdown device such as a diac. To avoid radio frequency interference, each controller further includes a low pass, LC radio frequency interference filter.

The control circuit further includes four diodes. The "third"(system) diode is serially connected with the first controller between the two control circuit connection nodes for simultaneous conduction of the first controller and the first load for positive half-waves and the "fourth" system diode is similarly connected and poled for simultaneous conduction of the second controller and the second load for negative half-waves. To complete the control circuit, a fifth and a sixth diode are provided connected between each pair of controller terminals to preclude significant voltage inversion across the associated controller terminals for isolation between the individual controllers.

In the exemplary remote control application, the double load is the combined fan and light fixture installed in a ceiling connection box and a double controller installed in a wall box. With an ac main available at one of the boxes, a two conductor cable will provide the necessary serial connection of the double control circuit and the double load circuit to the ac main. In effect, the arrangement, in requiring only two conductors, uses the diodes in such a way that one conductor provides a return path and the other conductor provides incident half-wave power to each load alternately. Viewed in another manner, one conductor of the cable is used to convey one terminal of the ac line to the remote connection box, while the other conductor interconnects the two other circuit nodes, so that both circuits are properly serially energized from the ac line.

BRIEF DESCRIPTION OF THE DRAWINGS

The novel and distinctive features of the invention are set forth in the claims appended to the present application. The invention itself, together with further objects and advantages thereof, may best be understood by reference to the following description and accompanying drawings, in which:

DESCRIPTION OF THE PREFERRED EMBODIMENT

Figure 1:
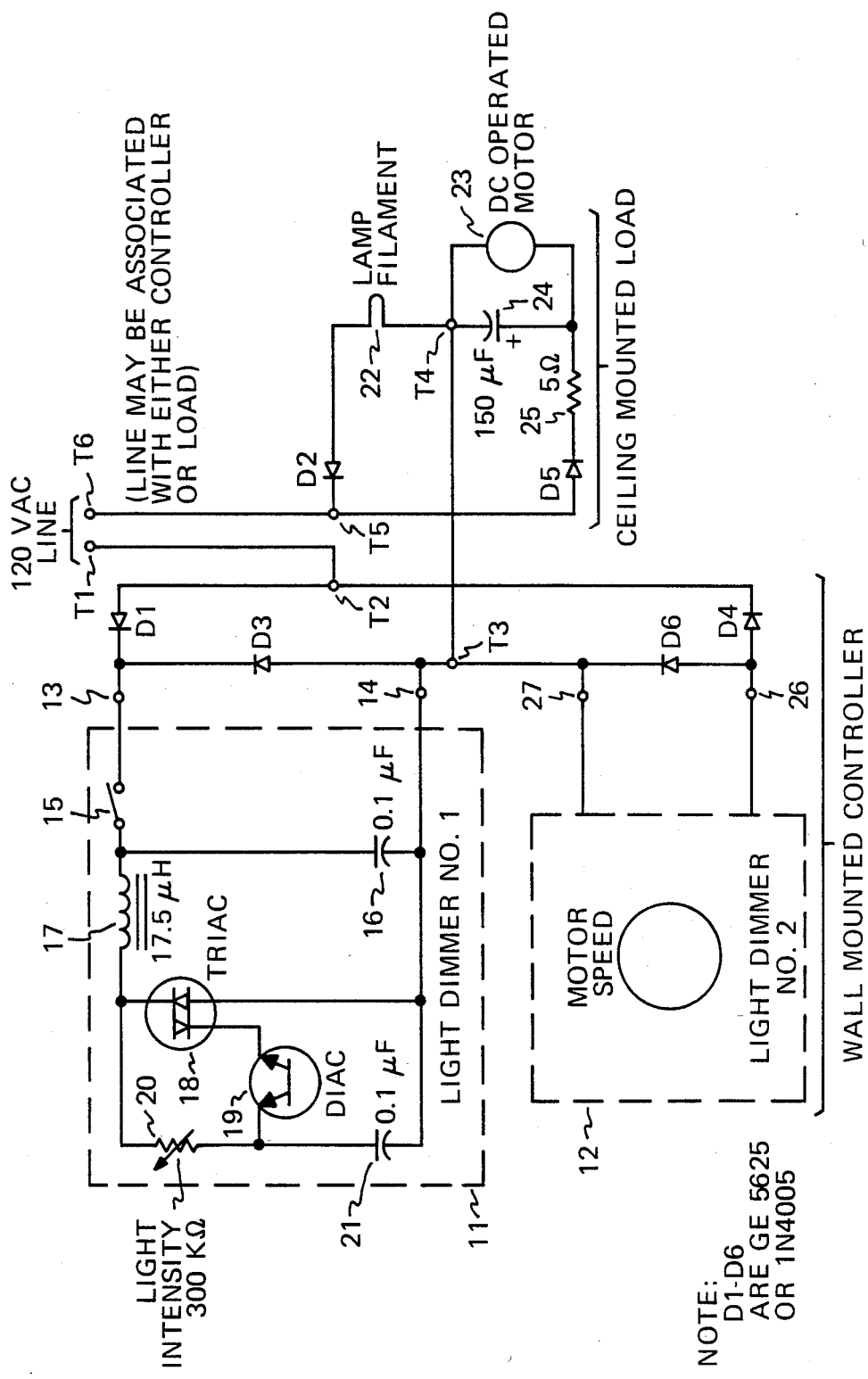
FIG. 1 is an electrical diagram showing a novel arrangement for achieving independent remote control of a dual load such as a combined dc operated motor and an incandescent light.

A novel arrangement for independent remote control of a ceiling fan and light is shown in FIG. 1. An advantage of the illustrated arrangement is that in an installation in which a dual load controller is housed in an electrical connection box on the wall, and in which a combined ceiling fan and lighting fixture is mounted on an electrical connection box on the ceiling, only a two conductor cable interconnecting these boxes is required to achieve independent, continuously variable control of the speed of the fan and brightness of the light. The advantage is particularly meritorious where the combined fan and light are added to replace an existing light fixture, and only a two wire cable interconnects the two connection boxes.

The system for independent control of a ceiling fan and a light consists of a double power control circuit having two connection nodes ($T_2$, $T_3$) and a double power load circuit having two connection nodes ($T_4$, $T_5$). The connection nodes of the power control and load circuits are serially connected between the terminals ($T_1$, $T_6$) of a 120 V ac main. The mode of serial connection is as follows: The ac main terminal ($T_1$) is connected to the first controller circuit connection node ($T_2$); the second controller connection node ($T_3$) is connected to the first load node ($T_4$); the second load node ($T_5$) is connected to the second terminal ($T_6$) of the 120 V ac main. The actual direction of current flows in the separate branches of the load and power control circuits, and operation of the control system for independent remote control of each load will be taken up after a more detailed treatment of the concerned power controller circuit.

As seen in FIG. 1, the control circuit consists of first and second two terminal semiconductor power controllers (11, 12) and four diodes D1, D3, D4, D6 external to the controllers. Both controllers 11 and 12 may be of the design shown for controller 11 in FIG. 1. The design shown at 11 is that of a commercially available light dimmer manufactured by General Electric, and designed for dimming an incandescent light of 600 watts (or less). The controller has two external terminals 13 and 14. In the conventional application, it is serially connected with an incandescent lamp forming the load across an ac line.

The power controller 11 comprises the elements 13–21. The elements of the power controller include the two connection terminals 13, 14, and SPST switch 15, a low pass LC filter (comprising the capacitor 16 and choke coil inductor 17), a triac (a three electrode ac semiconductor switch) 18, a diac (a diode ac semiconductor switch) 19 having a symmetrical positive and negative breakover voltage, and a manually adjustable phase shift network including the manually variable resistor 20, and a capacitor 21. The self-latching "triac" is a bidirectionally conductive, negative resistance device with conduction occurring between the first and second principal electrodes under the control of a third, gate electrode. The "diac", also bidirectionally conductive once breakover takes place, is also a self-latching, negative resistance device with conduction occurring between its two electrodes.

The elements of the power controllers 11, 12 are interconnected as follows between the two power controller terminals. The first terminal 13 of the light dimmer 11 is connected to the stationary contact of SPST switch 15. The moving contact or pole of the switch 15 is connected to the input of the filter 16, 17. The capacitor 16 is connected between the pole of the switch 15 and the dimmer terminal 14. The inductor 17 is connected between the pole of the switch and the "second" principal electrode of the triac 18. The second principal electrode of the triac is also connected to a first terminal of the variable resistance 20 of the phase shift network (19, 20, 21). The first principal electrode of the triac 16 is connected to the dimmer terminal 14 and a first terminal of the capacitor 21 of the phase shift network. The second terminal of the variable resistor 20 and the second terminal of the capacitor 21 are connected together to a first terminal of the diac 19. The second terminal of the diac 19 is connected to the gate electrode of the triac 18.

The illustrated controller 11 is conventionally used to regulate the power applied from an ac line to an ac energized load, such as an incandescent lamp. In the illustrated controller, power to the load is regulated by controlling the percentage of the on-time or the conduction duty cycle of a recurrently operated semiconductor switch serially connected with the load. In the disclosed dimmer, the "triac" is that switch, and its principal electrodes are the electrical contacts of that switch. The negative resistance property of the triac makes it self-latching. Thus, when a potential exists between the principal electrodes of the triac, a small trigger pulse applied to its gate will make it conductive, and it will remain conductive after passage of the trigger pulse. The triac will remain conductive until its current falls below the "holding current". This usually occurs in an ac circuit because the voltage across the ac line reverses in polarity, causing the voltage between the principal electrodes of the triac to go through a null.

The controller 11, when operated as a dimmer for an incandescent lamp (e.g. lamp 22) in a conventional circuit, is serially connected with that load across the ac line. For purposes of discussion, let us neglect the diodes D1 and D2 in the FIG. 1 circuit assuming their replacement by two conductive paths. Let us further assume the connections illustrated in FIG. 1.) To institute lamp operation, the switch 15 is closed, and assuming that the terminal T1 of the line is momentarily positive, the current flows from $T_1$ into the controller terminal 13, the stationary contact, and then the pole of the switch 15, the inductor 17 of the RFI filter (which is of low impedance at dc and line frequencies), the second and then the first principal electrodes of the triac 17, the terminal 14 of the controller and via the lamp filament 22 to the other terminal ($T_6$) of the ac line. Due to the serial connection of the triac with the lamp load, when it is ON, current will flow to the lamp. Controlling the percentage of time that the triac is conductive, i.e., controlling its conduction duty cycle, adjusts the percentage of time that the lamp filament is energized and thereby regulates power dissipated in the filament and the light output. In short, the controller may be used to dim the lamp.

The manually adjustable phase shift network 20, 21 (for purposes of discussion, still assuming that the diodes D1 and D2 are removed and conductive paths substituted) acting through the diac 19 upon the gate of the triac 18, controls the duty cycle of the triac. The phase shift network is serially connected with the load across the ac line. Commencing with the line terminal $T_1$, the series path includes the controller terminal 13, the closed SPST switch 15, the inductor 17, the variable resistor 20 and capacitor 21 of the phase shift network, the controller terminal 14, the lamp filament 22, and the line terminal $T_6$. Assuming that the lamp 22 is quiescent and in a low resistance condition and assuming a conventional low impedance for the inductor 17, substantially the full line voltage is available across the phase shift network. This voltage, which leads the line voltage due to the presence of the capacitor 21 by an angle somewhat less than 90°, has a magnitude which is an adjustable fraction of the line voltage. The output of the phase shift network available at the interconnected terminals of 20 and 21 is coupled via the diac 19 to the triac 18, as earlier noted. The diac is bidirectionally conductive, breaking down in either direction, when a predetermined breakdown voltage is exceeded. Assuming that the voltage produced in the phase shift network momentarily exceeds that required to break down the diac, a trigger voltage will be coupled to the triac causing it to conduct at some point in the ac wave. Conduction by the diac 19 partially discharges the capacitor 21 into the gate of the triac 18.

With the phase shift network indicated in FIG. 1, a trigger point occurs once each half wave in quadrant I for the positive half wave and in quadrant III for the negative half waves. Triac conduction is terminated once each half wave as the interelectrode voltage in the triac reverses and the triac current falls below the minimum holding current required to sustain conduction. The "unlatching" instant is relatively fixed, while the triggering point is readily adjusted by adjustment of resistance 21. The indicated circuit, while having a limited control range largely due to the hysteresis effect of the diac, is simple and suitable for application to lamp dimming, heater and fan speed controls.

The foregoing "conventional" dimmer/lamp circuit has been explained assuming operation with a full wave sinusoidal waveform. The conventional lamp circuit has symmetry in operation between the positive and negative half waves of the applied sinusoidal waveform. Thus, the circuit fires once and terminates conduction in each negative half cycle. The two conductive periods, assuming a resistive load, are normally equal and the lamp receives half its energy from the positive half waves and half of its energy from the negative half waves. The reason that the firing circuit will function symmetrically is that while the sinusoidal source waveform is being applied between the principal electrodes of the triac, an advanced replica of the same sinusoidal waveform is being applied via the diac to the gate of the triac. The positive-negative symmetry arises because both waveforms reverse themselves in the second half wave and in a bidirectional switch, the same conduction intervals reoccur, but with currents in the opposite sense.

For appropriate triggering operation, the advanced waveform should possess a monotonically increasing ramp of substantial duration through which gate control may be effected. A sinusoidal wave has a ramp whose duration is the relatively long period of one-quarter of the wave (90°) which may be used once each half wave (180°). In accordance with the invention, this symmetrical conduction property between successive half waves is recognized. The operation of a double power controller with a double load in which one controller operates on positive half waves of the ac waveform to control power to one load and a second controller operates on negative half waves of the ac waveform to control power to a second load will now be described.

In the FIG. 1 embodiment, diodes D1 to D6 are provided to provide isolation, so that each power control controls one load, and as will be seen, so that the power controllers are isolated from one another.

The first power controller 11 and the first load, incandescent lamp 22, are interconnected and operate as follows. The node $T_2$ of the double power control circuit is coupled to the ac line at terminal $T_1$. The node $T_2$ is also connected to the anode of the diode D1, whose cathode is connected to the terminal 13 of the power controller 11. The terminal 14 of the power controller is connected to the node $T_3$ of the power control circuit, and the node $T_3$ is connected to the node $T_4$ of the double load circuit. The incandescent lamp 22, which is the first load, has one terminal connected to the node $T_4$, and the other terminal coupled to the anode of the diode D2, whose cathode is coupled to the node $T_5$, which in turn is connected to the other terminal $T_6$ of the ac line.

If the foregoing circuit is traced, it will be seen that, if the ac line voltage is such that line terminal $T_1$ is momentarily positive (and that line terminal $T_6$ is momentarily negative), the diodes D1 and D2 are conductive and current flows serially from ac terminal $T_1$, through a controller 11 into the lamp load 22 to the line terminal $T_6$. If the polarity of its ac line voltage reverses, the diodes D1 and D2 are reversely biased, and no current flows in this circuit. One may note that the diode D3, whose cathode is coupled to the controller terminal 14, is non-conductive during the "positive" half wave, while during the "negative" half wave it provides a low impedance path across the terminals of the controller 11, setting a maximum voltage across the controller of approximately a diode drop (0.6 volts). This prevents the activation of the controller 11 during the negative half waves, and has other ameliorative effects in relation to switching performance.

The lamp selected for application in a combined light, ceiling fan may typically use a 100 watt filament. If greater maximum brightness is desired, a lower resistance, higher wattage filament may be used. The control range of light output is substantial, and may approach extinction. Complete extinction is more efficiently achieved by operation of the switch 15, however.

The second power controller 12 and the second load (fan motor 23, shunt capacitor 24 and series resistor 25) are interconnected and operate as follows. The node $T_2$ of the double power control circuit is coupled to the ac line at terminal $T_1$. The node $T_2$ is also connected to the cathode of the diode D4, whose anode is connected to the terminal 26 of the power controller 12. The terminal 27 of the power controller is connected to the node $T_3$ of the power control circuit, and the node $T_3$ is connected to to the node $T_4$ of the double load circuit. The second load is in part the dc operated fan motor 23, which has its first terminal connected to the node $T_4$, and in part to the RC filter network, which provides filtered dc to the motor. The filter network comprises a 100µfd capacitor 24, having its negative terminal connected to the node $T_4$, and its positive terminal connected to the second motor terminal. The positive terminal of the capacitor 24, and the second motor terminal are connected via serial filter resistance 25 (of 5 ohms) to the cathode of the diode D5. The anode of D5 is coupled to the node $T_5$, which is in turn connected to the other terminal $T_6$ of the ac line, completing the second load circuit.

If the foregoing second load circuit is traced, it will be seen that, if the ac line voltage is such that line terminal $T_6$ is momentarily positive and that line terminal $T_1$ is momentarily negative, the diodes D5 and D4 are conductive and current flows serially from ac terminal $T_6$, through the motor load and filter (23, 24, 25) into the controller 12 to the line terminal $T_1$. More particularly at node $T_5$, the current flows via diode D5, via the series connected resistance 25 into the capacitor 24 and motor 23, which are mutually in shunt. The filter 25, 24 converts the spaced negative half waves resulting from half wave rectification by the diodes, into a sustained dc voltage (subject to substantial ripple, however) suitable for operation of a dc motor.

When the polarity of ac line voltage reverses, the diodes D5 and D4 are reversely biased, and no current flows from the ac line into the motor load circuit. The diode D6, whose anode is coupled to the controller terminal 26, and whose cathode is coupled to the controller terminal 27, is non-conductive during the "negative" half wave, while during the "positive" half wave it is conductive, providing a low impedance path across the terminals of the controller 12, setting a maximum voltage across the controller of approximately a diode drop (0.6 volts). This prevents the activation of the controller 12 during the positive half waves, and has other ameliorative effects in relation to switching performance, which will be discussed subsequently.

The fan motor should be suitable for dc operation, and in a typical application to a large diameter ceiling fan, dissipates approximately 50 watts at maximum power. The motor may be a universal type of motor (i.e., capable of ac or dc operation) and having a rotation rate suitable for a large diameter fan, or an electronically commutated motor of equivalent power and suitable rotational rate. U.S. Pat. No. 4,327,302 issued Apr. 27, 1982 to Doran D. Hershberger, and U.S. Pat. No. 4,005,347 issued Jan. 25, 1977 to David M. Erdman, disclose suitable electronically commutated motors. In either case, the range of adjustment of the rotational rate of the fan is set by the range of voltage variation available at the output of the dc filter (24, 25). The power available to the motor, while only being supplied to the filter from the ac line during the negative half cycles can be increased to somewhat higher values, if desired by increasing the size of the filter capacitor 24 to sustain the output voltage of the filter to closer proximity to peak value of the line voltage. (Similarly, if higher dissipation is sought for the filament 22, a capacitor may be added, connected in shunt with the filament, to store energy for lamp energization during the negative half cycles, while no energy is being supplied from the ac line to the lamp circuit.)

Figure 2:
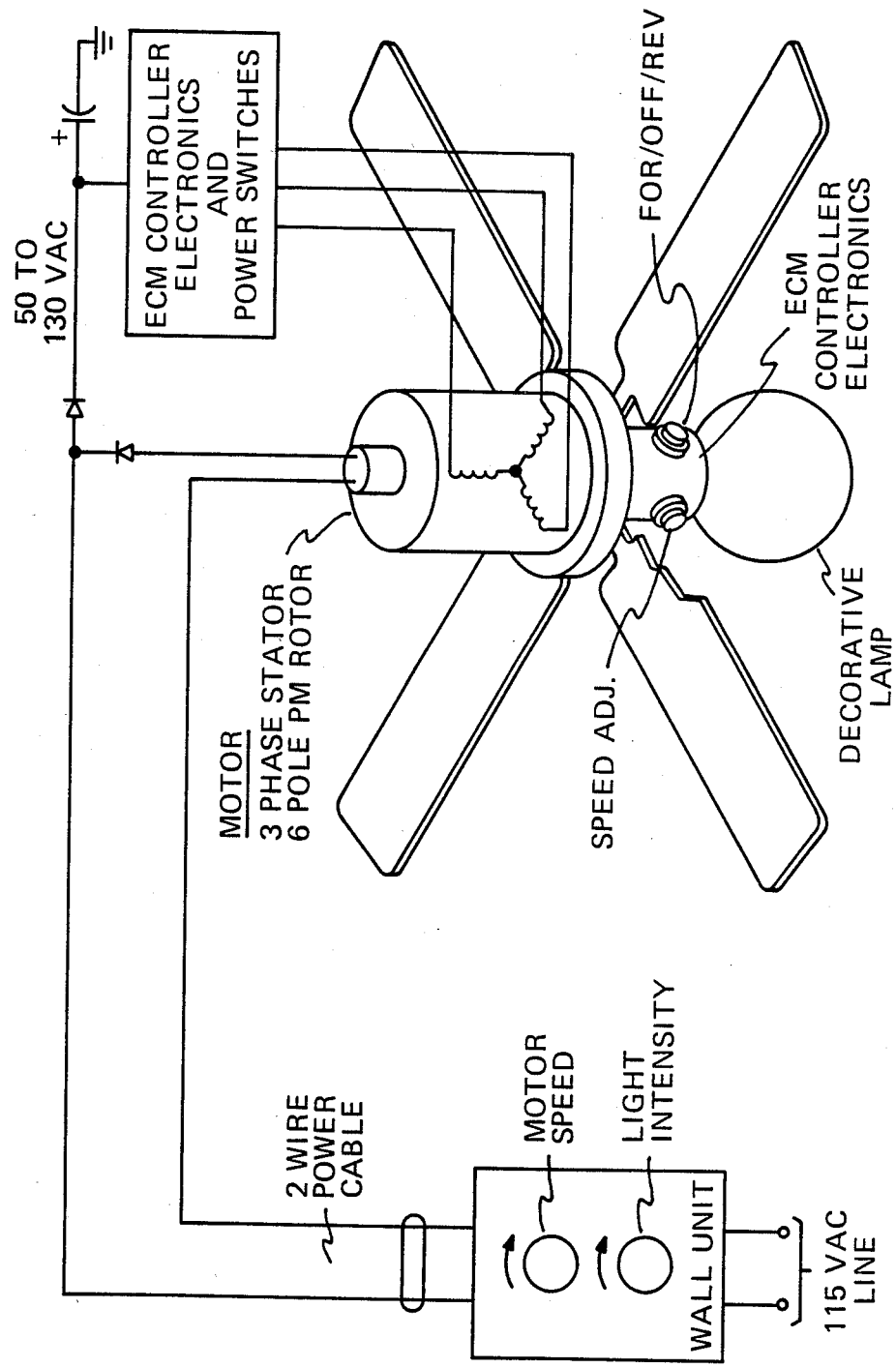
FIG. 2 is a simplified diagram showing a specific application of the invention to a combined light-ceiling fan, the fan using an electronically commutated motor.

In addition to the controls to the fan and lamp at the wall, the fan traditionally includes additional (and normally less accessible controls) on the housing. These controls normally provide for reversing the fan, turning off the light and an adjustment of the range of speed that adjustment of the controller will permit. A typical installation is shown in FIG. 2.

The diodes D3 and D6 are necessitated in the practical embodiments herein described by the properties of the individual power controllers. In particular, as the diodes are recurrently turned off, they retain stored charge, and since the triac requires relatively little hold-in current, the stored charge may be adequate to keep the triac firing for some time after the circuit was designed to turn off. The triac, when it is turned on, typically does so with a steep wavefront, which may cause radio frequency interference. This interference is reduced to an acceptable limit by low pass LC filter 16, 17. The inductance 17 of the filter, when current is being reduced at the end of the conduction cycle, tends to sustain current and reversely charge capacitors 16 and 21. The diode D3 allows the inductive discharge to be completed without allowing the capacitor 21 in the phase shift network to remain charged in the reverse direction and reinstitute conduction of the triac in the negative half wave. After the initial switching transients have subsided, the capacitor 21 in the input circuit of capacitor 16 in the LC filter is clamped by the diode D3 to a maximum negative voltage of approximately 0.6 volts. The diode clamp insures that after the power controller 11 has shut down during the positive half wave, that no voltage in excess of a diode drop will be applied to the gate of the diac 19 during the negative half wave, and reactivate the circuit.

As earlier noted, the foregoing circuit allows for the installation of the double power control circuit in a wall mounted electrical connection box and the installation of the double load circuit—the combined fan and light—in a ceiling mounted electrical box. If the installation is one in which the wall mounted box and ceiling mounted box are already in place, and interconnected by a two wire electrical cable, the interconnection requires no additional cable to be run, greatly reducing the installation expense. The advantage occurs whether the ac line is present at the ceiling box or at the wall box. As may be seen from an inspection of FIG. 1, in the case where the ac line is available at the wall box, one conductor of the two conductor cable is used to connect line terminal $T_6$ to load node $T_5$, and the other conductor is used to connect control circuit node $T_3$ to load node $T_4$. If the ac line is available at the ceiling box, one conductor of the two conductor cable is used to connect line terminal $T_1$ to control circuit node $T_2$, and the other conductor is used to connect control circuit node $T_3$ to load circuit node $T_4$, as before. The first arrangement, in which the ac line is available at the wall mounted connection box, is illustrated in FIG. 2.

The invention has equal application to installations using conduit, grounded or ungrounded cable or other less conventional wiring systems. While the principal advantage urged is that of avoiding the need to run extra cabling within finished partitions, the invention has the added advantage of minimum cost in the actual controlling circuitry.

While in principle, non-bidirectional semiconductor switching devices might be employed, as for instance SCRs, the approach is not equally economical, because of the need for an isolating transformer, normally coupling a diac to the gate of the SCR, which is more costly than the diodes required when bidirectional switching devices are employed. It should also be noted that, while the drawing illustrates a separate diac and a separate triac, combined devices or "Quadracs" are equally applicable.

The output waveform available from the present arrangement for load energization prior to filtering is a pulsating half wave having both a substantial dc and a substantial ac component. The illustrated loads have been incandescent lamps and motors. Incandescent lamps are equally energizable from an ac or a dc line, or from a waveform containing mixed ac and dc content. The motors illustrated have been either universal motors operable from either an ac or dc line or an electronically commutated motor, usually operated from a dc supply. In the illustration, the output to the motor is filtered to provide primarily dc energization.

Other optimizations of the output waveform are possible. For instance, one may increase the output filtering, to convert the ac component to a nearly pure dc component. If the filter capacitor is adequately large, the effective average dc output voltage available to a load may approach the peak of the half wave and retain only a relatively small ac ripple. By this means, the power available from an unfiltered supply can be increased by a factor, usually exceeding two. The voltage can change from $V\sqrt{2}$ to $V\sqrt{2}$ in going from an unfiltered supply to an infinitely filtered supply. This represents a maximum (theoretical) increase in power of 4.

If, however, a load requiring ac operation is contemplated, one may use the significant ac component present at half the voltage of the initial wave. This half voltage may be transformed to full voltage for use with a conventional ac load. The voltage across the transformer cannot be allowed to swing to the opposite polarity however or else it will interfere with the other control. When the ac component is used, it is necessary to "vent" the dc component. A simple decoupling capacitor by itself will not work as it will simply charge up to the voltage peak and keep the routing diode permanently back-biased. "Venting" can be accomplished by placing a parallel RC network in series with the ac load, e.g., the transformer primary.

I claim:

1. A power control combination for use in a system for independently remotely controlling a fan motor load and a lighting load from a common ac source having a substantially sinusoidal waveform, comprising:
   A. a double load circuit having two connection nodes, comprising:
      (1) the fan motor and lighting loads, each having two terminals,
      (2) a first diode serially connecting said lighting load between the load circuit connection nodes, said first diode being connected for conduction in a first sense, and
      (3) a second diode serially connecting said fan motor load between said load circuit connection nodes, said second diode being connected for conduction in a second sense opposite to said first sense,
   B. a power control circuit having two connection nodes adapted for serial connection with the two connection nodes of the load circuit to a common ac source, comprising:
      (1) a first and a second two-terminal, semiconductor power controller, each adapted for serial connection with a remote load to a source, and having an adjustable duty cycle when halfwaves of a substantially sinusoidal power waveform are applied,
      (2) a third diode serially connected with said first controller between said two control circuit connection nodes, said first diode being connected for conduction in said first sense for simultaneous conduction of said first controller with said first load for positive halfwaves, and
      (3) a fourth diode serially connected with said second controller between said control circuit connection nodes, said second diode being connected for conduction in said second sense for simultaneous conduction of said second controller with said second load, for negative halfwaves,
   whereby upon association of an ac main with one of said circuits, said serial interconnection may be achieved by a two conductor cable;
   C. (1) a fifth diode connected between the two terminals of said first controller,
      (2) a sixth diode connected between the two terminals of the second controller,
   said fifth and sixth diodes being poled to preclude significant voltage inversion across the associated controller terminals for isolation between the individual controllers, and operating to inhibit current conduction through their associated controllers for more than a half of each wave of applied power; and
   D. a capacitor connected in shunt with the motor terminals for smoothing the voltage applied to the motor.

2. A power control combination for use in a system for independently remotely controlling a fan motor load and a lighting load from a common ac source having a substantially sinusoidal waveform, comprising:
   A. a double load circuit having two connection nodes, comprising:
      (1) the fan motor and lighting loads, each having two terminals,
      (2) a first diode serially connecting said lighting load between the load circuit connection nodes, said first diode being connected for conduction in a first sense, and
      (3) a second diode serially connecting said fan motor load between said load circuit connection nodes, said second diode being connected for conduction in a second sense opposite to said first sense,
   B. a power control circuit having two connection nodes adapted for serial connection with the two connection nodes of the load circuit to a common ac source, comprising:
      (1) a first and a second two-terminal, semiconductor power controller, each adapted for serial connection with a remote load to a source, and having an adjustable duty cycle when halfwaves of a substantially sinusoidal power waveform are applied,
      (2) a third diode serially connected with said first controller between said two control circuit connection nodes, said first diode being connected for conduction in said first sense for simultaneous conduction of said first controller with said first load for positive halfwaves, and (3) a fourth diode serially connected with said second controller between said control circuit connection nodes, said second diode being connected for conduction in said second sense for simultaneous conduction of said second controller with said second load, for negative halfwaves, whereby upon association of an ac main with one of said circuits, said serial interconnection may be achieved by a two conductor cable; and C. a capacitor connected in shunt with the motor terminals for smoothing the voltage applied to the motor.

3. A power control combination for use in a system for independently remotely controlling a fan motor load and a lighting load from a common ac source having a substantially sinusoidal waveform, comprising:

A. a double load circuit having two connection nodes, comprising:
  (1) the fan motor and lighting loads, each having two terminals,
  (2) a first diode serially connecting said lighting load between the load circuit connection nodes, said first diode being connected for conduction in a first sense, and
  (3) a second diode serially connecting said fan motor load between said load circuit connection nodes, said second diode being connected for conduction in a second sense opposite to said first sense, B. a power control circuit having two connection nodes adapted for serial connection with the two connection nodes of the load circuit to a common ac source, comprising:
  (1) a first and a second two-terminal, semiconductor power controller, each adapted for serial connection with a remote load to a source, and having an adjustable duty cycle when halfwaves of a substantially sinusoidal power waveform are applied,
  (2) a third diode serially connected with said first controller between said two control circuit connection nodes, said first diode being connected for conduction in said first sense for simultaneous conduction of said first controller with said first load for positive halfwaves, and
  (3) a fourth diode serially connected with said second controller between said control circuit connection nodes, said second diode being connected for conduction in said second sense for simultaneous conduction of said second controller with said second load, for negative halfwaves, whereby upon association of an ac main with one of said circuits, said serial interconnection may be achieved by a two conductor cable;

C. means for precluding significant voltage inversion across the controller terminals for isolation between the individual controllers, and for inhibiting current conduction through their associated controllers for more than a half of each wave of applied power; and D. a capacitor connected in shunt with the motor terminals for smoothing the voltage applied to the motor.

4. A power control combination for use in a system for independently remotely controlling a fan motor load and a lighting load from a common ac source having a substantially sinusoidal waveform, comprising:

A. a double load circuit having two connection nodes, comprising:
  (1) the fan motor and lighting loads, each having two terminals,
  (2) a first diode serially connecting said lighting load between the load circuit connection nodes, said first diode being connected for conduction in a first sense, and
  (3) a second diode serially connecting said fan motor load between said load circuit connection nodes, said second diode being connected for conduction in a second sense opposite to said first sense, B. a power control circuit having two connection nodes adapted for serial connection with the two connection nodes of the load circuit to a common ac source, comprising:
  (1) a first and a second two-terminal, semiconductor power controller, each adapted for serial connection with a remote load to a source, and having an adjustable duty cycle when halfwaves of a substantially sinusoidal power waveform are applied,
  (2) a third diode serially connected with said first controller between said two control circuit connection nodes, said first diode being connected for conduction in said first sense for simultaneous conduction of said first controller with said first load for positive halfwaves, and
  (3) a fourth diode serially connected with said second controller between said control circuit connection nodes, said second diode being connected for conduction in said second sense for simultaneous conduction of said second controller with said second load, for negative halfwaves, whereby upon association of an ac main with one of said circuits, said serial interconnection may be achieved by a two conductor cable; and C. a fifth diode connected between the two terminals of said first controller, (2) a sixth diode connected between the two terminals of the second controller, said fifth and sixth diodes being poled to preclude significant voltage inversion across the associated controller terminals for isolation between the individual controllers, and operating to inhibit current conduction through their associated controllers for more than a half of each wave of applied power.

5. A system powered by an ac source for operating a ceiling mounted fixture including a fan from a wall mounted control circuit comprising:

A. an electronically commutated motor in driving relation with said fan and forming a part of said ceiling fixture;

B. at least one incandescent lamp forming a second part of said ceiling fixture; and C. a first pair of diodes, one serially connected with said electronically commutated motor and the other serially connected with said lamp between a first and a second load connection node at said ceiling fixture; and D. a wall mounted power control circuit for controlling the energization of said electronically commutated motor and said at least one lamp independently, said power control circuit having two connection nodes of said load circuit to a common ac source, and comprising:
(1) a first and a second two-terminal, continuously adjustable semiconductor power controller, each adapted for serial connection with a remote load to a source,
(2) a third diode serially connected with said first controller between said control circuit connection nodes, said first node being connected for conduction in said first sense for simultaneous conduction of said first controller with said first load for positive half waves of said ac source,
(3) a fourth diode serially connected with said second controller between said control circuit connection nodes, said second diode being connected for conduction in said second sense for simultaneous conduction of said second controller with said second load, for negative halfwaves of said ac source,
whereby upon association of an ac main with one of said circuits, said serial interconnection may be achieved by a two conductor cable;
said power control circuit further including a fifth diode connected between said two terminals of said first controller, and
a sixth diode connected between the two terminals of said second controller,
said fifth and sixth diodes being poles to preclude significant voltage inversion across the associated controller terminals for isolation between the individual controllers.

6. The system of claim 5 further comprising a capacitor connected in shunt with the electronically commutated motor for smoothing the voltage applied to the motor.

7. A method of operating an electronically commutated fan driving motor load and a light load at a first location from a double section power adjusting controller at a second location, the energy being supplied from an ac source at one of said locations, the method comprising the steps of:
A. supplying alternating current energization from said ac source to a first pair of terminals at one of said locations;
B. supplying bidirectional currents from one of said energized terminals to a node of said dual section controller;
C. separating said currents at said controller node at said second location by direction, the positive current being conducted to one controller section and negative current being conducted to the other controller section;
D. combining the unidirectional currents flowing through said controllers and supplying the resulting bidirectional currents via a single conductor from said second location to said first location;
E. separating said last recited bidirectional current at said first location by direction, the positive current being conducted to one load, and the negative current being conducted to the other load;
F. combining said unidirectional currents flowing through said loads at said first location and supplying the resulting bidirectional current to said other energized terminal;
G. precluding significant voltage inversion across the terminals of the controllers and inhibiting current conduction through each controller for more than half of each wave of applied power; and
H. smoothing the voltage applied to the electronically commutated motor.

* * * * *